April 28, 1964     J. A. HANSEN     3,131,289
DEFLECTION VOLTAGE SUPPLY FOR ELECTRON BEAM WELDERS
Filed June 25, 1962     2 Sheets-Sheet 1

INVENTOR
JOHN A. HANSEN
BY
AGENT

April 28, 1964      J. A. HANSEN      3,131,289
DEFLECTION VOLTAGE SUPPLY FOR ELECTRON BEAM WELDERS
Filed June 25, 1962      2 Sheets-Sheet 2

INVENTOR
JOHN A. HANSEN
BY
AGENT

United States Patent Office 3,131,289
Patented Apr. 28, 1964

3,131,289
DEFLECTION VOLTAGE SUPPLY FOR ELECTRON
BEAM WELDERS
John A. Hansen, Granby, Conn., assignor to United Aircraft Corporation, East Hartford, Conn., a corporation of Delaware
Filed June 25, 1962, Ser. No. 204,758
5 Claims. (Cl. 219—121)

My invention relates to deflecting intense beams of charged particles. More particularly, my invention relates to an improved deflection voltage supply circuit for an electron beam welding machine.

Electron beam machines, as they are generally known, are devices which use the kinetic energy of an electron beam to work a material. U.S. Patent No. 2,987,610, issued June 6, 1961, to K. H. Steigerwald, discloses such a machine. These machines operate by generating a highly focused beam of electrons. The electron beam is a welding, cutting and machining tool which has practically no mass but has high kinetic energy because of the extremely high velocity imparted to the electrons. Transfer of this kinetic energy to the lattice electrons of the workpiece generates higher lattice vibrations which cause an increase in the temperature within the impingement area sufficient to accomplish work. In fact, the temperature becomes so high that the material melts and even evaporates. This evaporation, in turn, permits deep penetration of the workpiece by the beam. That is, deep penetration can only be achieved by evaporation of a fine channel in the material.

In performing work such as butt welding with an electron beam, the beam is focused at the seam to be welded and the beam and work are moved relative to each other thereby causing the beam to move along the seam and make the weld. Under circumstances where the two pieces to be butt welded do not fit together firmly, a gap will be left. In order to weld such pieces, it therefore becomes necessary to sweep the beam back and forth across the gap during the above-mentioned relative motion. Also, in welding metals such as titanium, it has been found to be necessary to sweep the beam back and forth across the seam even when the pieces butt together firmly to produce a satisfactory weld without causing thermal damage to the material. For the above reasons, it is necessary to provide a deflection voltage supply for an electron beam welding machine that will cause the beam to oscillate across the seam being welded.

Prior art electron beam welders have atempted to provide the necessary oscillatory deflection by borrowing from the teachings of the cathode-ray tube art. That is, the prior art machines utilize either a sawtooth or square-wave deflection voltage. Circuits to generate these voltages, however, are relatively expensive and, as shall be explained below, do not always produce the desired effect.

Electron beam welding is an electron penetration rather than a thermal conduction phenomenon. As explained above, deep penetration of the electron beam depends on the evaporation of a fine channel in the material. The weld is produced by the back flow of molten material into this channel. Obviously, to produce the optimum weld, the beam should penetrate to a great depth and, if possible, completely through the workpiece. The depth of penetration is controlled by certain adjustable parameters in the beam generator and also the speed at which the beam moves over the work. If a square wave is used to deflect a constant intensity beam across the seam being welded, the depth of penetration will be a function of the speed of relative movement between the seam and beam focus point and the period of the deflection voltage. That is, the beam will be deflected to a point determined by the magnitude of the square-wave voltage and will remain at this point, as the relative movement occurs, for a time period equal to one-half cycle of the deflection voltage. Thus, if a square-wave deflection voltage is used, two separate distinct zones of deep penetration are produced, one at each extreme of deflection, with hardly any penetration in between. If a sawtooth wave is used a similar effect is observed. However, in this case the heat generated between the two hotter zones at the extremes of deflection is considerably higher than in the case of the square wave. There are two major reasons that the heat and thus the penetration is not uniformly distributed as one would expect for a sawtooth deflection voltage. First, due to the inductance of the deflection coils, the deflection current is not truly sawtooth shaped. The peaks of the current wave shape and hence the deflection wave shape is, therefore, actually flattened or rounded off. Since the heat generated and thus the penetration is a function of the time the beam dwells at one location, the depth of penetration of a constant intensity beam will be directly proportional to the rate of change of the deflection current. The rate of change of the sawtooth current will, of course, be slower at these flattened peaks of the wave than at other times during the cycle. Secondly, penetration is determined not only by the relative velocity between the beam spot and the workpiece surface but also by the temperature of the workpiece. When the beam spot at maximum deflection, starts to move in the opposite direction it will, at first, strike material which is still very hot due to the recent pass of the beam in the same half cycle of deflection. The penetration of the beam will therefore be greater toward the edges of the bead, even for a perfect sawtooth wave. Contributing to this effect is the fact that the beam path during each half cycle of deflection will overlap or nearly overlap that of the previous half cycle of deflection.

My invention overcomes the above disadvantages of the prior art by providing an improved deflection voltage supply for an electron beam welding machine.

It is, therefore, an object of my invention to deflect a beam of charged particles.

It is also an object of my invention to produce a deflection voltage which will result in a beam of charged particles dwelling at desired points within the range of deflection longer than at other points within said range.

It is yet another object of my invention to produce a deflection voltage for a machine that works materials with an intense beam of charge particles such that the depth of beam penetration across the material being worked is controllable.

It is a further object of my invention to produce a deflection voltage for an electron beam welding machine of such wave form that more heat will be produced at the center of the welding zone and less toward the sides.

It is still another object of my invention to produce a deflection voltage for an electron beam welding machine with adjustable wave form which allows the operator to select the most desirable heat distribution across the welding zone for the type of work to be welded.

It is another object of my invention to provide an inexpensive deflection voltage supply that will accomplish the other objects of my invention.

These and other objects of my invention are accomplished by providing a novel circuit for varying the wave form of an oscillating voltage. The circuitry of my invention generates a strong third harmonic of an applied oscillating voltage and adds desired amounts of this third harmonic to the original signal to thereby produce the desired deflection voltage wave form.

My invention may be better understood with reference to the accompanying drawing in which.

Figure 1:
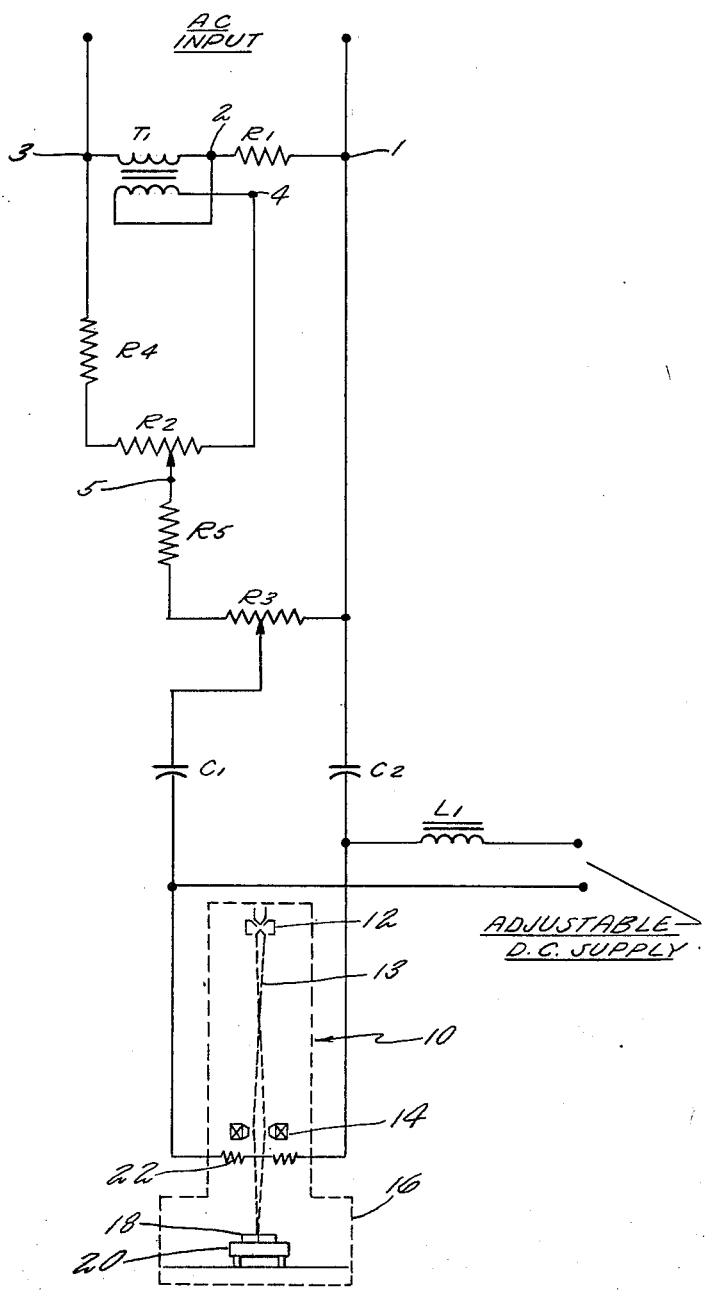
FIG. 1 is a schematic of a preferred circuit which comprises my invention.

Referring now to FIGURE 1, an electron beam machine is shown generally at 10. This machine comprises an electron gun 12, means, not shown, for focusing the electrons emitted from gun 12 into an intense beam 13, and a magnetic lens assembly 14 for focusing beam 13 on a workpiece. The machine 10 also includes work chamber 16 wherein the piece or pieces to be welded 18 are positioned on a movable table 20. In the usual mode of operation, the beam 13 is focused at one end of a seam on the workpiece 18 which is to be welded and the table 20 is caused, by means not shown, to move so that the beam will follow the seam being welded. Under certain conditions, as explained above, it is necessary to deflect beam 13 back and forth across the seam being welded as table 20 moves. For this purpose there are provided two pairs of deflection coils 22, only one of which 22 is shown.

Figure 5:
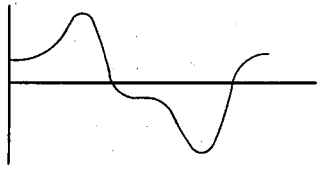

For the purposes of explanation, my invention will be described in connection with the use of a deflection voltage supply which provides a sinusoidal input voltage. In the case where this sinusoidal input voltage is from a 60 cycle 115 volt A.C. source, my invention employs a transformer T1 the primary winding of which is wound with a relatively low number of turns so that, if 115 volts is applied, the core will become highly saturated during each half cycle. The exact number of turns wound on transformer T1 will, as is well known in the art, be determined by the sectional area and permeability of the core and the voltage to be applied. As is also well known in the art, saturation of a transformer causes a strong third harmonic of the applied voltage to be generated. To limit the excitation current which, due to the condition of saturation, would be excessive, a resistor R1 is connected in series with the primary winding of T1. A further purpose of R1 is to produce a voltage which is proportional to the current in the primary winding of T1. During each half cycle of the applied sinusoidal voltage, the flux produced in the core of transformer T1 will reach a point at which the core saturates. At this time, the inductance and thus the reactance of the primary winding will decrease and the rate of change of current therethrough will increase accordingly so that the resultant current wave form will be distorted from a pure sinusoidal wave. As mentioned above, this resultant wave form will be rich in the third harmonic due to saturation of transformer T1, which saturated condition will occur during the middle of the half cycle. Therefore, the current peak will occur during the latter half of each half cycle of the applied voltage. The voltage across R1, from point 1 to point 2, hence is a 60 cycle voltage with a strong third harmonic, approximately as shown in FIGURE 5.

The secondary winding of T1 is wound with approximately the same number of turns as the primary winding and the two windings are connected together at point 2 with reversed polarity. That is, the voltage between points 3 and 4 is twice the voltage between points 2 and 3. The primary and secondary windings of transformer T1 and resistors R2 and R4 form a bridge circuit with the terminals of the bridge being points 2, 3, 4 and the wiper arm of potentiometer R2. The voltage between points 3 and 4 is applied across a voltage divider which makes up two legs of this bridge circuit and which is comprised of resistor R4 connected in series with a potentiometer R2. The resistance of R4 is chosen to be much smaller than the resistance measured across the end terminals of R2. The voltage taken from the brush of potentiometer R2 is applied through a second potentiometer R3, which adjusts the amplitude of the voltage from R2, to deflection coils 22. Thus, the deflection voltage will be the voltage between points 1 and 5.

Since R2 and R4 form a voltage divider, for some intermediate setting of the brush on R2, the voltage between points 2 and 5 will be essentially zero. That is, at this intermediate setting, the bridge will be balanced and the voltages induced in the primary and secondary windings of T1 will cancel each other. For this particular setting of R2, the voltage between points 1 and 5 is essentially the same as the voltage across R1 thereby producing the deflection voltage wave form shown in FIGURE 5.

Figure 2:
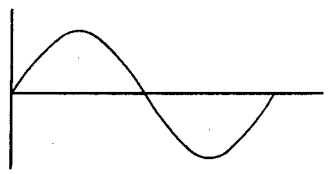
FIGURES 2 through 5 show various wave forms which may be generated with my invention.
Figure 6:
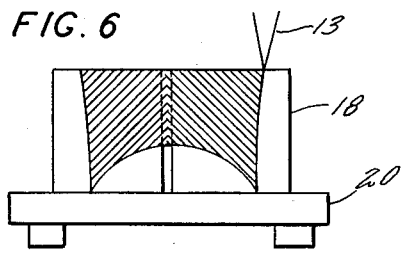
FIGURES 6 through 8 are cross-sectional views of workpieces welded on a machine employing my invention.

As the brush on R2 is moved from the intermediate position toward R4, the voltage between points 1 and 5 obviously will have a wave shape which approaches that of the applied sinusoidal voltage. That is, if the brush of potentiometer R2 is moved to the extreme left, as shown in FIGURE 1, the sinusoidal input voltage will be applied directly across potentiometer R3. The desired amplitude of this voltage may be selected by adjusting the brush of potentiometer R3. This sinusoidal voltage is depicted in FIGURE 2 and a cross-section of the weld which will be produced when it is applied to the deflection coils to deflect the beam across the seam of the moving workpiece is shown in FIGURE 6. The pentration pattern, as shown in FIGURE 6, varies inversely with the velocity of the beam spot relative to the workpiece surface.

Figure 7:
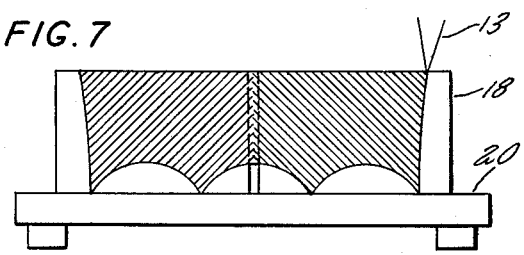

On the other hand, if the brush on R2 is moved from the position where a sinusoidal deflection voltage is applied toward point 4, more of the voltage induced in the secondary winding of transformer T1 is added to the deflection voltage until, with the brush at the extreme right as shown in FIGURE 1, the voltage between points 1 and 5 will have a wave shape determined primarily by the voltage across resistor R1 minus the voltage across the secondary winding of T1. The voltage across the secondary winding of transformer T1 will have a wave form determined by the magnitude of the sinusoidal input voltage less the voltage developed across resistor R1. This voltage, because of reversed polarity connection of the secondary winding and the circuit parameters, will be opposite in polarity and greater in magnitude than the voltage across R1. Subtracting the transformer secondary voltage from the voltage across resistor R1 results in a voltage being applied across R3 having the wave form depicted in FIGURE 4. The results of applying this deflection voltage to deflection coils 22 is the penetration pattern shown in FIGURE 7.

Figure 3:
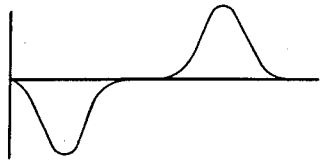
Figure 4:
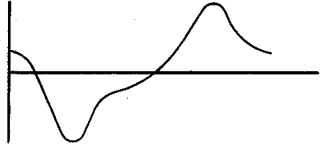
Figure 8:
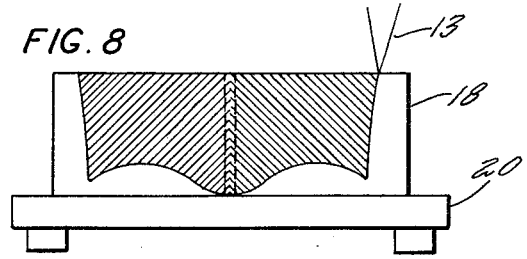

Between the two brush positions which produce the wave shapes shown in FIGURES 4 and 5 there is a position at which the symmetrical wave shape of FIGURE 3 is produced. As should be obvious, as less of the voltage across the secondary winding of transformer T1 is subtracted from the voltage across resistor R1, the deflection voltage wave form will approach that shown in FIGURE 3. This wave shape oftentimes is the more desirable since it produces a high penetration at the center of the weld as shown in FIGURE 8.

In cases where the seam being welded follows an irregular pattern it becomes necessary to add a D.C. component to the deflection voltage so that the mid-range of the sweep of the beam remains at the seam. For this purpose an adjustable D.C. supply, not shown, is added to the circuit. Addition of the D.C. voltage requires the use of capacitors C1 and C2 to prevent D.C. current from entering the A.C. circuit, and a choke 21 to prevent the A.C. current from entering the D.C. circuit. Resistors R4 and R5 are used for limiting the maximum current to deflection coils 22 and, in the case of R5, for power factor correction for the load impedance.

While a preferred embodiment has been shown and described, various modifications and substitutions may be made without deviating from the scope and spirit of my invention. For example, a second pair of deflection coils may be provided to deflect the beam along the seam rather than using a movable table. Also, while I have discussed using my invention to supply voltage to deflection coils, for magnetic deflection it is equally applicable to an electrostatic deflection system. Thus my invention is described by way of illustration rather than limitation and accordingly it is understood that my invention is to be limited only by the appended claims taken in view of the prior art.

I claim:

1. Apparatus for working materials with an intense beam of charged particles comprising:
   means for generating an intense beam of charged particles,
   means for focusing said beam on a workpiece,
   means for producing relative movement between the workpiece and the beam along a predetermined path,
   means for deflecting the beam transversely to said path during said relative movement in response to an applied voltage,
   a source of oscillating voltage coupled to said beam deflecting means, and
   means electrically coupled to said source of oscillating voltage for adjusting the wave form of the voltage applied therefrom to said deflecting means whereby the rate of deflection of the beam transverse to said path is caused to vary in a predetermined manner within the range of deflection.

2. The apparatus of claim 1 wherein the means for adjusting the wave form of the oscillating voltage comprises:
   means for generating a voltage rich in a third harmonic of the oscillating voltage, and
   means connected between said source of oscillating voltage and said deflecting means and responsive to said generated voltage for producing a deflection voltage having a wave form which is a variable function of said oscillating and generated voltages.

3. The apparatus of claim 2 wherein the means for generating a voltage rich in a third harmonic of the oscillating voltage comprises:
   a series circuit including the primary winding of a saturable transformer and at least one other impedance element connected across said source of oscillating voltage.

4. The apparatus of claim 3 wherein said means for generating a deflection voltage having a variable wave form comprises:
   means including the secondary winding of said transformer connected to an intermediate junction in said series circuit for generating a voltage commensurate with the oscillating voltage less the voltage rich in a third harmonic thereof, and
   a potentiometer having a first end thereof connected to the end of said series circuit comprising the junction of said primary winding and said source and having its other end connected to said means including the transformer secondary winding, the deflection voltage appearing between the movable tap on said potentiometer and the end of said series circuit comprising the junction of said impedance element and said source.

5. The apparatus of claim 1 further comprising:
   means for adding a direct current voltage to the oscillating voltage applied to said beam deflecting means.

References Cited in the file of this patent
UNITED STATES PATENTS

| | | |
|---|---|---|
| 2,823,258 | Schlesinger et al. | Feb. 11, 1958 |
| 2,989,614 | Steigerwald | June 20, 1961 |
| 3,033,974 | Schleich et al. | May 8, 1962 |